(12) United States Patent
Merlo et al.

(10) Patent No.: US 8,372,237 B2
(45) Date of Patent: Feb. 12, 2013

(54) PROCESS FOR OBTAINING CCM WITH SUBGASKETS

(75) Inventors: Luca Merlo, Como (IT); Alessandro Ghielmi, Milan (IT); Vincenzo Arcella, Milan (IT)

(73) Assignee: Solvay Solexis S.p.A., Milan (IT)

( * ) Notice: Subject to any disclaimer, the term of this patent is extended or adjusted under 35 U.S.C. 154(b) by 1053 days.

(21) Appl. No.: 11/645,538

(22) Filed: Dec. 27, 2006

(65) Prior Publication Data

US 2007/0175584 A1    Aug. 2, 2007

(30) Foreign Application Priority Data

Dec. 28, 2005   (IT) ................ MI2005A2508

(51) Int. Cl.
*B32B 37/00* (2006.01)
*B29C 65/00* (2006.01)
*H01M 8/00* (2006.01)

(52) U.S. Cl. .................. 156/324; 429/510; 429/535

(58) Field of Classification Search ............... 156/308.2, 156/309.6, 324, 298, 299; 429/12, 36, 463, 429/508, 509, 510, 535
See application file for complete search history.

(56) References Cited

U.S. PATENT DOCUMENTS

| | | | |
|---|---|---|---|
| 2,242,218 A | 5/1941 | Auer | |
| 3,282,875 A | 11/1966 | Connolly et al. | |
| 3,660,200 A * | 5/1972 | Anderson et al. | 156/278 |
| 3,665,041 A | 5/1972 | Sianesi et al. | |
| 3,715,378 A | 2/1973 | Sianesi et al. | |
| 3,810,874 A | 5/1974 | Mitsch et al. | |
| 4,035,565 A | 7/1977 | Apotheker et al. | |
| 4,243,770 A | 1/1981 | Tatemoto et al. | |
| 4,272,353 A * | 6/1981 | Lawrance et al. | 204/283 |
| 4,433,082 A | 2/1984 | Grot | |
| 4,564,662 A | 1/1986 | Albin | |
| 4,610,762 A | 9/1986 | Birdwell | |
| 4,666,648 A | 5/1987 | Brittain | |
| 4,694,045 A | 9/1987 | Moore | |
| 4,745,165 A | 5/1988 | Arcella et al. | |
| 4,943,622 A | 7/1990 | Naraki et al. | |

(Continued)

FOREIGN PATENT DOCUMENTS

EP      0 136 596 A2    4/1984
EP      0 148 482 A2    7/1985

(Continued)

*Primary Examiner* — John Goff
(74) *Attorney, Agent, or Firm* — Arent Fox LLP (57) ABSTRACT

A continuous process for applying subgaskets to surfaces of CCM subassemblies, comprising:
  a) preparation of a roll (A), wherein on each of two surfaces, electrocatalytic layers longitudinally distributed at regular intervals are applied;
  b) preparation of two subgasket rolls (B) wherein, on a subgasket sheet, in correspondence to the position of the electrocatalytic layers in the roll (A), openings are made; the percent ratio (subgasket opening area)/(electrocatalytic layer area) being between 90% and 99%;
  c) hot lamination of two rolls (B) with the roll (A); the step being carried out so that the perimeter of the openings of the two rolls (B) falls inside the area of the electrocatalytic layers, and obtaining a roll (C), wherein on each of the two surfaces of the sheet formed of a CCM sequence (roll (A)) a subgasket sheet (roll (B)) is applied.

18 Claims, 5 Drawing Sheets

U.S. PATENT DOCUMENTS

| | | | |
|---|---|---|---|
| 5,173,553 A | 12/1992 | Albano et al. | |
| 5,211,984 A | 5/1993 | Wilson | |
| 5,234,777 A | 8/1993 | Wilson | |
| 6,555,639 B2 | 4/2003 | Apostolo et al. | |
| 6,639,011 B2 | 10/2003 | Arcella et al. | |
| 6,756,147 B1 * | 6/2004 | Bronold et al. | 429/35 |
| 6,933,003 B2 | 8/2005 | Yan | |
| 8,012,284 B2 * | 9/2011 | Debe et al. | 156/182 |
| 2003/0221311 A1 * | 12/2003 | Smith et al. | 29/623.2 |
| 2004/0091767 A1 * | 5/2004 | Zuber et al. | 429/40 |
| 2004/0241525 A1 * | 12/2004 | Mekala et al. | 429/36 |
| 2005/0163920 A1 | 7/2005 | Yan et al. | |

FOREIGN PATENT DOCUMENTS

| | | |
|---|---|---|
| EP | 0 199 138 A2 | 10/1986 |
| EP | 0 239 123 A2 | 9/1987 |
| EP | 0 410 351 A1 | 9/1991 |
| EP | 0 661 304 B1 | 7/1995 |
| EP | 1 004 615 B1 | 5/2000 |
| EP | 1 239 000 A1 | 9/2002 |
| EP | 1 589 062 A2 | 10/2005 |
| WO | 97/40924 A1 | 11/1997 |

* cited by examiner

FIG. 1

PRIOR ART

PROCESS FOR OBTAINING CCM WITH SUBGASKETS

CROSS-REFERENCE TO RELATED APPLICATIONS

This nonprovisional application claims the benefit of Italian Application No. MI2005 A 002508, filed Dec. 28, 2005. The disclosure of the prior application is hereby incorporated herein by reference in its entirety.

BACKGROUND OF THE INVENTION

The present invention relates to a process for obtaining CCM (Catalyst Coated Membranes) composites equipped with subgaskets on each side, to be used in electrochemical cells.

The composite of the present invention comprises a membrane formed of (per)fluorinated ionomers.

Composites formed of membranes having catalyst coated surfaces are known in the prior art. Said composites are generally known with the name Catalyst Coated Membrane or CCM. The two CCM electrocatalytic layers form respectively the positive electrode and the negative electrode of the electrochemical cell. Electrocatalytic layer means a layer containing a metal having the property to act as catalyst of the reaction which takes place in the cell semielement wherein there is the electrode.

For the use in electrochemical devices, in particular in fuel cells, the membrane with the electrocatalytic layers is assembled with layers for the gas diffusion, by placing at least one of said layers on each CCM side. Said diffusion layers are contacted with bipolar plates, which separate the single cells, thus forming electrical series. The obtained assembly is also called fuel cell stack.

The CCM surface fraction which is involved in the electrochemical reaction is called as active area. The above gas diffusion layers, applied to the catalyst coated membrane, have the purpose to protect the CCM integrity when contacted with the bipolar plates, and furthermore to assure the reactant feeding and the reaction water discharge.

The use of protective films, formed by inert materials towards the reaction taking place in the electrochemical device is known in the prior art. These protective films are known as subgaskets. The films are generally applied on both sides of the MEA device composite with the purpose of improving the handling thereof, rendering easier for example the assembly in the electrochemical devices. Further, the subgaskets protect the polymeric electrolyte from the contact with the bipolar MEA plates. The subgasket covers the non-active area of the device and therefore has a central empty space in correspondence of the active area. A CCM with the subgasket is reported in FIG. 1, wherein (2') represents the subgasket and (1') the active area.

Figure 1:
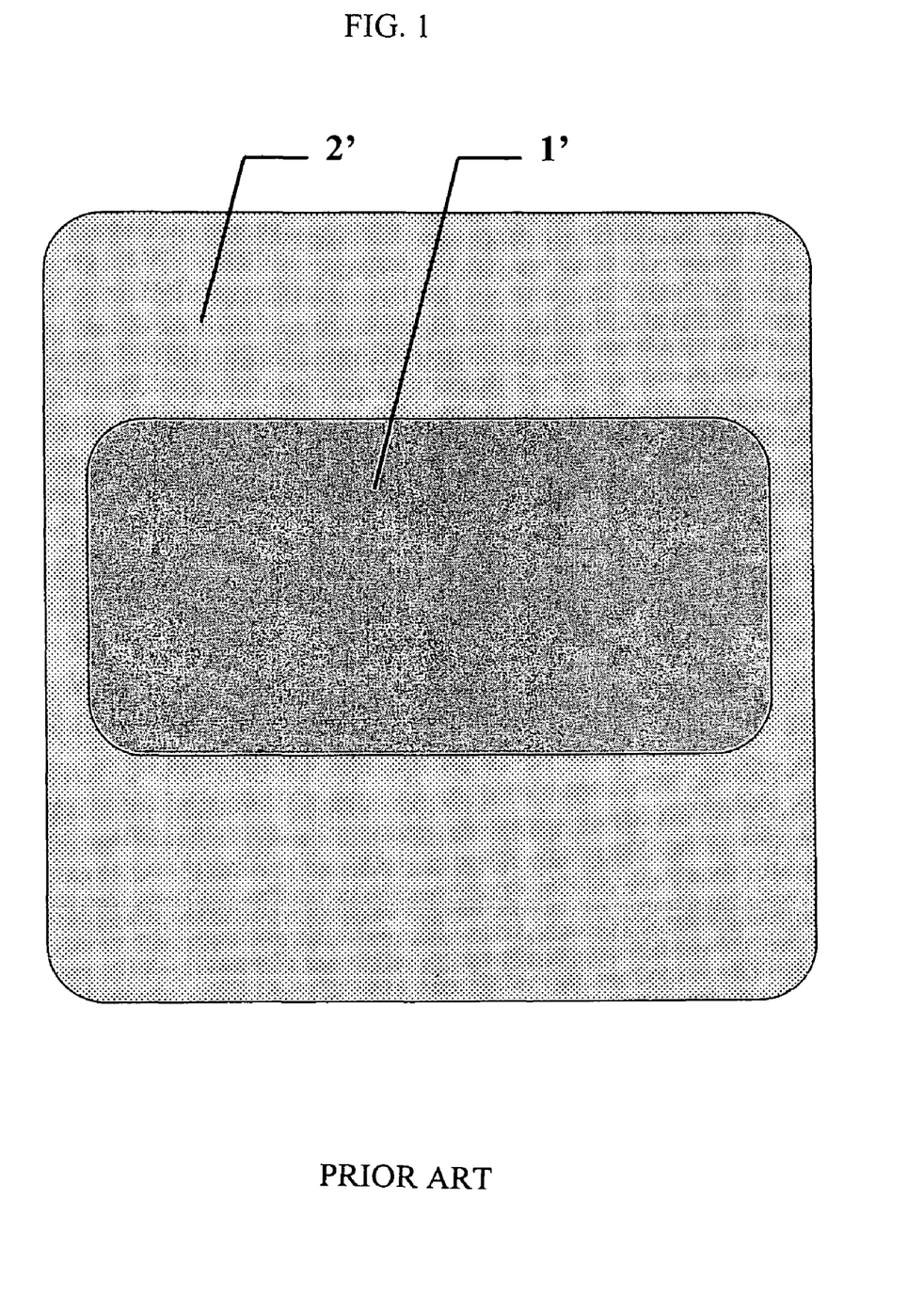
In FIG. 1, which depicts a prior art CCM with a subgasket, (2') represents the subgasket and (1') represents the active area.

Therefore a CCM with subgasket is generally formed of the following parts:
- an internal layer formed of an ionomeric membrane;
- two surface layers, one on each side of the internal layer and symmetrically placed, composed of the following parts:
  - an active area, generally placed in the central position of the surface layer;
  - a subgasket (2') delimiting the active area (FIG. 1).

The need was felt to have available a continuous process for obtaining CCM assemblies as above, having a subgasket on each of the two surfaces.

SUMMARY OF THE INVENTION

The Applicant has surprisingly and unexpectedly found a continuous process solving the above technical problem.

Figure 2:
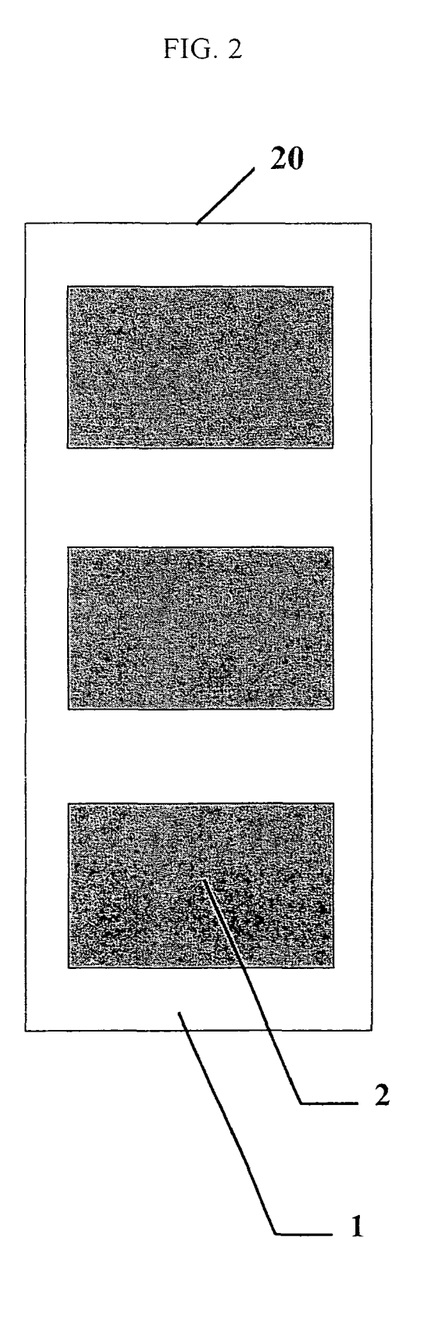
In FIG. 2, which depicts preparation of a roll (A), (20) represents a composite formed of a central layer (1) constituted by an ionomeric membrane sheet having on each side an electrocatalytic layer (2) longitudinally symmetrically placed at regular intervals.
Figure 3:
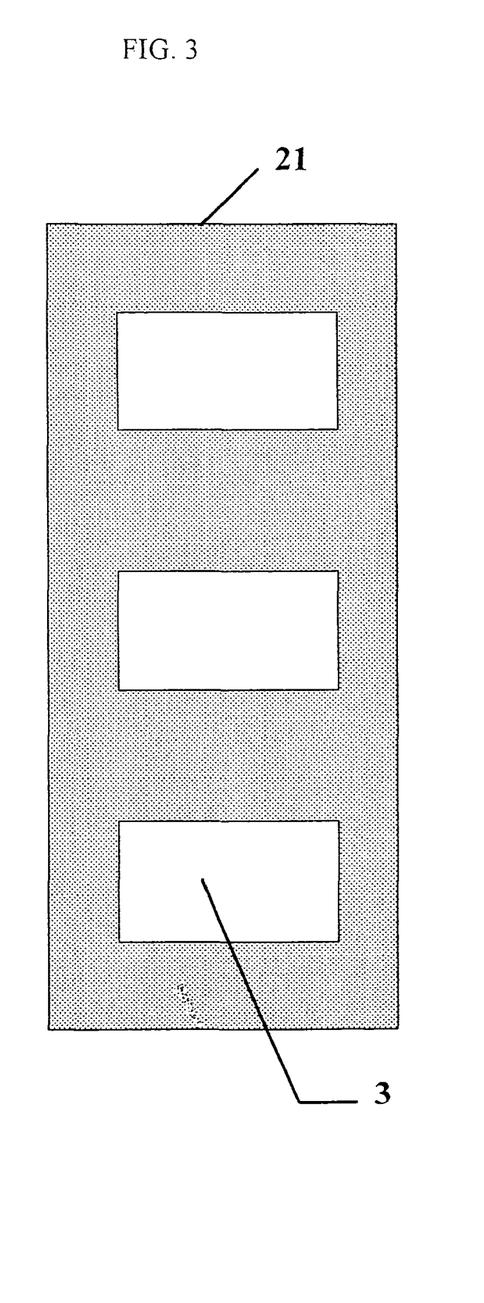
In FIG. 3, which depicts preparation of two subgasket rolls (B), (21) represents a subgasket sheet having openings (3) in correspondence to the position of the electrocatalytic layers (2) of the roll (A).
Figure 4:
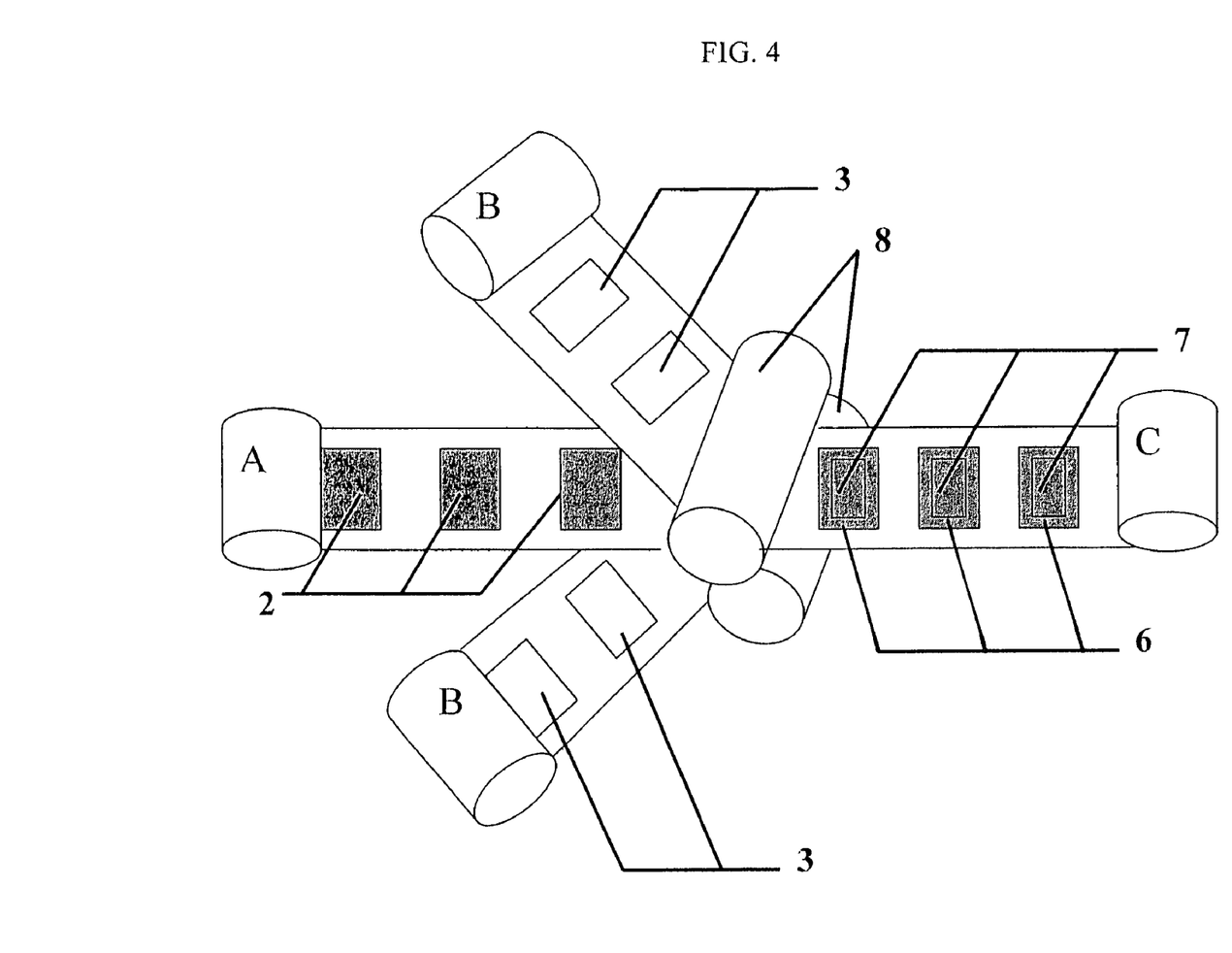
In FIG. 4, which is a schematic perspective view of the process of the invention, (7) represents the electrocatalytic layer not covered by the subgasket, (6) is the electrocatalytic layer covered by the subgasket (7).
Figure 5:
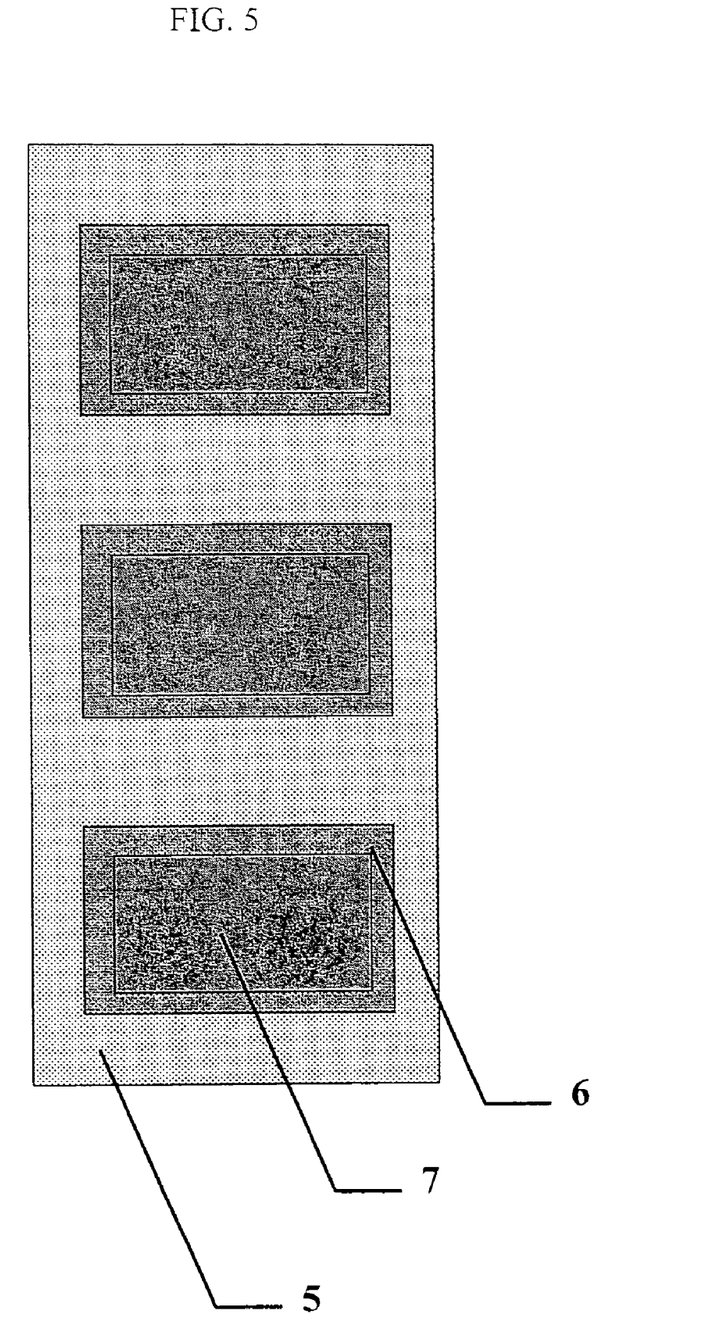
In FIG. 5, which is a plan view of the CCM with the two subgaskets, (5) represents the subgasket sheet, (7) and (6) has the meaning indicated in FIG. 4.

An object of the present invention is a continuous process for obtaining CCM assemblies having a subgasket on each side, comprising the following steps:

a) preparation of a roll (A) formed of a composite (20) as shown in FIG. 2 formed of a central layer (1) constituted by an ionomeric membrane sheet having on each side an electrocatalytic layer (2) longitudinally symmetrically placed at regular intervals.

b) preparation of two subgasket rolls (B), having geometry shown in FIG. 3, wherein the subgasket sheet (21) has openings (3) in correspondence to the position of the electrocatalytic layers (2) of the roll (A); the percent ratio (subgasket opening area (3))/(electrocatalytic layer area (2)) being comprised between 90% and 99%;

c) hot lamination of the two rolls (B) with the roll (A) by feeding the roll (A) between the two rolls (B), see FIG. 4, between two drums (8); so that the perimeter of the openings (3) of the two rolls (B) falls inside the area of the electrocatalytic layers (2), thus obtaining a roll (C), formed of a CCM sequence with an applied subgasket (see FIG. 5). Generally the two subgasket rolls (B) have the same width of the roll (A). From roll (C) the CCM with subgasket are cut out and can be used in electrochemical devices.

DETAILED DESCRIPTION OF THE INVENTION

In step a), the roll (A) can for example be prepared by coupling a membrane sheet with the electrocatalytic layers by a continuous decal process as described in U.S. Pat. No. 6,933,003. Another method is by direct casting of the electrocatalytic layer on the membrane or by spraying of the catalyst on the membrane, as for example described in patent application US 2005/0163920.

The membrane and the electrocatalytic layers of the MEA device are obtainable by using (per)fluorinated ionomers, with sulphonic groups in —SO$_3$H or neutralized form, having equivalent weight from 380 to 1,600 g/eq, preferably from 500 to 1,200 g/eq, still more preferably 750-950 g/eq. The preferred ionomers comprise the following units:
(A) monomeric units deriving from one or more fluorinated monomers containing at least one ethylenic unsaturation;
(B) fluorinated monomeric units containing —SO$_2$F sulphonyl groups in amounts such that the ionomer has the equivalent weight in the above range.

Alternatively homopolymers formed of monomeric units (B) can be used as ionomers.

The ionomers containing the sulphonic groups in acid form —SO$_3$H can be obtained by hydrolysis of the —SO$_2$F groups, and optionally salification of the —SO$_3$H groups.

The fluorinated monomers (A) are selected from the following:
vinylidene fluoride (VDF);
C$_2$-C$_8$ perfluoroolefins, preferably tetrafluoroethylene (TFE);
C$_2$-C$_8$ chloro- and/or bromo- and/or iodo-fluoroolefins as chlorotrifluoroethylene (CTFE) and bromotrifluoroethylene;
CF$_2$=CFOR$_{fl}$ (per)fluoroalkylvinylethers (PAVE), wherein R$_{fl}$ is a C$_1$-C$_6$ (per)fluoroalkyl, for example trifluoromethyl, bromodifluoromethyl, pentafluoropropyl;
CF$_2$=CFOX perfluorooxyalkylvinylethers, wherein X is a C$_1$-C$_{12}$ perfluorooxyalkyl having one or more ether groups, for example perfluoro-2-propoxy-propyl;
fluorovinylethers (MOVE) of general formula CFX$_{A1}$=CXA$_{A1}$OCF$_2$OR$_{A1}$ (A-I), wherein R$_{A1}$ is a linear or branched C$_1$-C$_6$ (per)fluoroalkyl group or C$_5$-C$_6$ cyclic, or a linear or branched when possible C$_1$-C$_6$ (per)fluorooxyalkyl group containing from one to three oxygen atoms; when R$_{A1}$ is fluoroalkyl or fluorooxyalkyl as above it can contain from 1 to 2 atoms, equal or different, selected from the following: H, Cl, Br, I; X$_A$$_1$=F, H, preferably F; the preferred fluorovinylethers are:
(MOVE 1) CF$_2$=CFOCF$_2$OCF$_2$CF$_3$, (MOVE 2) CF$_2$=CFOCF$_2$OCF$_2$CF$_2$OCF$_3$, (MOVE 3) CF$_2$=CFOCF$_2$OCF$_3$.

The fluorinated monomers (B) are selected from one or more of the following:
F$_2$C=CF—O—CF$_2$—CF$_2$—SO$_2$F;
F$_2$C=CF—O—[CF$_2$—CX$_A$F—O]$_{nA}$—(CF$_2$)$_{nB}$—SO$_2$F wherein X$_A$=Cl, F or CF$_3$; nA=1-10, nB=2, 3;
F$_2$C=CF—O—(CF$_2$)$_{nC}$—SO$_2$F; nC=3-10;
F$_2$C=CF—Ar—SO$_2$F wherein Ar is an aromatic ring, the ring can be substituted in one or more positions free from aliphatic chains from 1 to 10 carbon atoms, optionally containing heteroatoms.

Other monomers (B'), which can be used instead or in addition to (B) for preparing the ionomers, are those having equivalent weight as reported for sulphonic ionomers. Monomers (B') contain precursor groups transformable by hydrolysis into —COOH acid groups, optionally their subsequent salification. These monomers can optionally be used in admixture with those containing —SO$_2$F groups.

Fluorinated monomers (B') used for preparing the ionomers containing —COOH acid groups have the following structures:
F$_2$C=CF—O—CF$_2$—CF$_2$—Y;
F$_2$C=CF—O—[CF$_2$—CX$_A$F—O]$_{nA}$—(CF$_2$)$_{nB}$—Y wherein X$_A$=Cl, F or CF$_3$; nA=1-10, nB=2, 3;
F$_2$C=CF—O—(CF$_2$)$_{nC}$—Y; nC=3-10;
F$_2$C=CF—Ar—Y wherein Ar is an aryl group; wherein Y is a precursor group of the carboxylic group, selected from the following: CN, COF, COOH, COOR$_B$, COO$^-$Me$^+$, CONR$_{2B}$R$_{3B}$, wherein R$_B$ is C$_1$-C$_{10}$, preferably C$_1$-C$_3$ alkyl and R$_{2B}$, and R$_{3B}$, equal or different, are H or have the meaning of R$_B$, Me is an alkaline metal.

As said, the fluorinated monomers (B') having the above formulas can be in admixture with the fluorinated monomers containing —SO$_2$F sulphonyl groups, the total amount of the monomers (B) and (B') being such that the equivalent weight of the ionomer is in the above range.

Optionally the fluorinated ionomers of the invention can contain from 0.01% to 2% by moles of monomeric units deriving from a bis-olefin of formula:

$$R_1R_2C=CH—(CF_2)_m—CH=CR_5R_6 \quad (I)$$

wherein:
m=2-10, preferably 4-8;
R$_1$, R$_2$, R$_5$, R$_6$, equal to or different from each other, are H or C$_1$-C$_5$ alkyl groups, preferably H.

Preferably the membranes and the electrocatalytic layers of the device of the present invention contain perfluorinated ionomers obtainable from ionomers comprising:
monomeric units deriving from TFE;
monomeric units deriving from CF$_2$=CF—O—CF$_2$CF$_2$SO$_2$F.

The hydrolysis of the precursors of the acid functional groups of the ionomers comprises two steps: the first is carried out in basic environment and the second in acid environment, obtaining the ionomers with functional groups in the acid form, —SO$_3$H and/or —COOH. For example, in case of sulphonyl —SO$_2$F precursor groups, they are transformed into sulphonic groups —SO$_3$H by the following steps:
salification of the —SO$_2$F form into the —SO$_3^-$Me$^+$ form, where Me is an alkaline metal;
acidification of the —SO$_3^-$Me$^+$ form into the —SO$_3$H form.

The first step can for example be carried out by mixing the ionomeric polymer with an aqueous solution containing 10% by weight of KOH, at a temperature in the range 60° C.-80° C., for a time higher than 2 hours, until disappearance of the —SO$_2$F groups (determined by IR analysis) and formation of the —SO$_3^-$Me$^+$ group. At the end of the salification step the ionomer is washed with water at a temperature preferably not higher than 25° C. The acidification step is carried out, for example, by transferring the salified ionomer in an aqueous solution containing 20% by weight of HCl at room temperature and by keeping under stirring for at least half an hour. At the end a washing is carried out with water according to the above modalities.

The ionomers used for preparing the membrane, when they are amorphous (per)fluorinated polymers, can be crosslinkable or crosslinked. When the membrane is formed of crosslinkable ionomers the crosslinking is carried out on the membrane.

To carrying out the crosslinking, the ionomer is mixed with crosslinking agents. The sulphonic fluorinated ionomers are crosslinked for example by peroxidic way. In this case they must contain radical attack sites in the chain and/or in end position to the macromolecules, for example iodine and/or bromine atoms. Preferably the crosslinkable fluorinated sulphonic ionomers comprise:
monomeric units deriving from TFE;
monomeric units deriving from CF$_2$=CF—O—CF$_2$CF$_2$SO$_2$F;
monomeric units deriving from the bis-olefin of formula (I);
iodine atoms in end position.

The introduction in the polymeric chain of said iodine and/or bromine atoms can be carried out by addition, in the reaction mixture, of brominated and/or iodinated "cure-site" comonomers as bromo- and/or iodo-olefins having from 2 to 10 carbon atoms, as described for example in U.S. Pat. Nos. 4,035,565 and 4,694,045, or iodo- and/or bromo- fluoro-alkylvinylethers, as described in U.S. Pat. Nos. 4,745,165, 4,564,662 and EP 199,138, in amounts such that the "cure-site" comonomer content in the final product is generally between 0.05 and 2 moles per 100 moles of the other basis monomeric units.

Alternatively, or also in combination with "cure-site" comonomers, the introduction of end iodine and/or bromine atoms can be carried out by addition to the reaction mixture of iodinated and/or brominated chain transfer agents as for example the compounds of formula $R_f(I)_x(Br)_y$, wherein $R_f$ is a (per)fluoroalkyl or a (per)fluorochloroalkyl having from 1 to 8 carbon atoms, while x and y are integers between 0 and 2, with $1 \leq x+y \leq 2$ (see for example U.S. Pat. Nos. 4,243,770 and 4,943,622). It is also possible to use as chain transfer agents iodides and/or bromides of alkaline or alkaline-earth metals, according to U.S. Pat. No. 5,173,553.

Preferably the crosslinking of radical type uses ionomers containing units of the bis-olefin of formula (I) and iodine in end position.

The sulphonic ionomer is crosslinked by radical way at a temperature in the range 100° C.-200° C., depending on the type of the peroxide used, by adding a peroxide capable to generate radicals by heating. Generally, the peroxide amount is between 0.1% and 5% by weight with respect to the polymer. Among the usable peroxides, the following ones can be mentioned: dialkylperoxides as, for example, di-terbutyl-peroxide and 2,5-dimethyl-2,5-di(terbutylperoxy)-hexane; dicumyl peroxide; dibenzoyl peroxide; diterbutyl perbenzoate; di-1,3-dimethyl-3-(terbutylperoxy)butylcarbonate. Other peroxidic systems are described, for example, in patents EP 136,596 and EP 410,351.

Optionally the following components can be added to the ionomer mixture together with the crosslinking agents:
  a crosslinking co-agent, in amounts between 0.5 and 10%, preferably between 1 and 7% by weight with respect to the polymer; among crosslinking co-agents it can be mentioned: triallyl-cyanurate; triallyl-isocyanurate (TAIC); tris(diallylamine)-s-triazine; triallylphosphite; N,N-diallyl-acrylamide; N,N,N',N'-tetraallyl-malonamide; trivinyl-isocyanurate; 2,4,6-trivinil-methyltrisiloxane; N,N'bisallylbicyclo-oct-7-ene-disuccinimide (BOSA); bis olefin of formula (I), triazine;
  a metal compound, in amounts between 1% and 15%, preferably between 2% and 10% by weight with respect to the polymer, said metal compound selected from divalent metal oxides or hydroxides as, for example, Mg, Zn, Ca or Pb, optionally associated to a weak acid salt as, for example, stearates, benzoates, carbonates, oxalates or phosphites of Ba, Na, K, Pb, Ca;
  conventional additives as thickeners, pigments, antioxidants, stabilizers and the like;
  inorganic or polymeric reinforcing fillers, preferably PTFE optionally fibrillable.
    Preferably the fillers have particle size from 10 to 100 nm, preferably 10-60 nm.

The ionomer used can optionally be mixed with another fluoropolymer. For example crystalline fluoropolymers such as PTFE, optionally modified with a comonomer as HFP (hexa-fluoropropene), VE (vinylethers), for example MFA, PFA, FEP, optionally modified with VE; PVDF, ECTFE, ETFE, PCTFE, can be mentioned.

Fluoroelastomers, preferably perfluoroelastomers, co-curable with the ionomer, can also be used. Preferably, for co-curing the fluoroelastomer contains iodine and/or bromine atoms. The TFE/perfluoromethylvinylether copolymer having a ratio by moles between the two monomers in the range 80/20-60/40, can for example be mentioned. Said copolymer is for example described in EP 661,304 and is used in amounts between 0 and 50% by weight with respect to the ionomer.

The ionomer and fluoroelastomer mixture can for example be a physical blend of solid polymers or of polymerization latexes. In this case the peroxide percentages to be used are to be referred to the mixture formed of the ionomer and the fluoroelastomer. Also for the optional agents which are added their respective percentages by weight are referred to said mixture.

The crosslinking blend is prepared, for example, by using mechanical mixers.

When in the crosslinking phase iodine has been used, its residual traces can be removed from the membrane by thermal post-treatment, at temperatures preferably in the range 200° C.-250° C.

The membranes and the electrocatalytic layers of the MEA device according to the present invention are prepared by using ionomer solutions and/or dispersions, prepared as, for example, described in EP 1,004,615 and U.S. Pat. No. 4,433,082. The membranes are obtained by casting the ionomer solutions and/or dispersions on non porous supports as, for example, described in U.S. Pat. Nos. 4,666,648 and in 4,610,762. Alternatively, the membranes can be prepared by impregnating porous inert supports as described, for example, in EP 1,239,000 or in patent application WO 97/40924.

The membranes can be also prepared by extrusion or skiving, for example as described in EP 1,589,062.

The membranes and the electrocatalytic layers generally have a thickness ranging from 3 micrometres to 100 micrometres. The membranes preferably from 10 to 80 micrometres, more preferably from 15 to 60 micrometres; the electrocatalytic layers preferably from 5 to 50 micrometres, more preferably from 5 to 30 micrometres.

The electrocatalytic layers comprise an ionomer and a catalyst, preferably Pt or a mixture of Pt with one or more metals as, for example, Ru, Rh, Mo. The catalyst is finely dispersed and preferably supported on carbon powder. Powders known with the following names: Vulcan XC-72, Ketjen Black, Black Pearls, Shawinigan Acetylene Black, etc. can for example be used. The ionomer has composition and/or equivalent weight equal to or different from the ionomer used in the membrane and/or in the other electrocatalytic layer. The ratio by weight between catalyst and ionomer in each of the two electrocatalytic layers generally ranges from 0.5 to 4, preferably between 0.5 and 2.5. The ratio by weight between metal and the support in the catalyst is preferably higher than or equal to 10, when as fuel hydrogen is used the ratio is between 20 and 60, when methanol is used between 60 and 100.

The ratio mg of catalyst metal/$cm^2$ of electrocatalytic layer generally ranges from 0.01 to 2. When in the cell hydrogen is used as fuel, the ratio (mg of catalyst metal)/($cm^2$ of electrocatalytic layer) preferably ranges from 0.01 to 0.7 mg/cm and preferably by using at the cathode side a ratio ranging from 0.1 to 0, 7 mg/$cm^2$. When methanol is used as fuel, said ratio preferably ranges from 0.3 to 1 mg/$cm^2$ from the anode side and from 0.5 to 2 mg/$cm^2$ from the cathode side.

The subgasket rolls (B) are prepared by using hydrogenated and fluorinated thermoplastic polymer sheets. PET, polyamides, FEP can be mentioned.

The subgasket rolls (B) are applied to the CCM roll (A) by using one of the following processes:
a') by adhesivizing the subgasket rolls (B) on the side in contact with the roll (A) by using a hot melt adhesive, generally formed of thermoplastic rubbers or hydrocarbon resins,
b') by adhesivizing the subgasket rolls (B) on the side in contact with the roll (A) by a pressure-sensitive adhesive,
c') by using subgasket rolls (B) in thermoplastic polymers with softening point between 100° C. and 150° C.

Preferably process a' is used for a better adhesion. A preferred hot melt adhesive is EVA (Ethylene Vinyl Acetate). Process a') allows also to carry out the discontinuous preparation of CCM assemblies with subgaskets. This means that (A) and (B) are adhered by hot pressing by using a hot-plate press.

It has been found unexpectedly and surprisingly by the Applicant that, when an hot melt adhesive is used the adhesion between CCM and subgasket is more durable and the assembling times of CCM with subgaskets are reduced.

In step b) of the continuous process the openings (3) of the rolls (B) can be for example obtained by a continuous punching process by using known techniques.

In step c) the hot lamination is generally carried out under the following conditions:
roll progress rate: 0.1-5 m/min;
pressure on the sheets to be laminated: 5-40 Kg/cm²;
temperature varying depending on the material and type of adhesive used for preparing the rolls (B); preferably the lamination temperature is not lower than 100° C. and higher than 150° C., more preferably it is not higher than 120° C.

A lamination temperature between 110° C. and 130° C. is used when the subgasket rolls (B) are formed of PET and adhesivized with EVA.

When subgasket rolls (B) formed of a thermoplastic with softening point between 100° C. and 150° C. are used, one generally operates at a lamination temperature of about 1° C.-5° C. lower than the softening point of the thermoplastic.

The preparation of the ionomers used for preparing the membranes can be carried out with a radical polymerization process in mass, solution, suspension, emulsion. See U.S. Pat. Nos. 3,282,875, 6,639,011, 6,555,639.

The aqueous emulsion or microemulsion polymerization can for example be mentioned. The surfactants usable in these polymerizations are (per)fluorinated surfactants, for example salts (as defined below) of the perfluorooctanoic, perfluorononanoic, perfluorodecanoic acid, or their mixtures, etc., (per)fluoropolyethers with an acid end group (example —COOH, —SO³H), salified with $NH_4^+$ or with alkaline metal cations, the other end group being (per)fluorinated, optionally containing one H or Cl atom. The number average molecular weights of the perfluoropolyether surfactants generally range between 300 and 1,800, preferably between 350 and 750.

The microemulsion polymerization is well known in the art. See U.S. Pat. No. 6,555,639.

In particular the preparation of the ionomers is carried out by using an aqueous emulsion wherein in the reaction medium, as surfactants, those of formula:

are used, wherein:
$X_1$ is equal to —COO, —SO$_3$;
M is selected from H, NH$_4$ or an alkaline metal;
R$_f$ represents a (per)fluoropolyether chain, preferably having number average molecular weight between about 300 and about 1,800, preferably from 300 to 750, said (per)fluoropolyether chain comprising repeating units selected from one or more of the following:
a) —(C$_3$F$_6$O)—;
b) —(CF$_2$CF$_2$O)—;
c) —(CFL$_0$O)—, wherein L$_0$=—F, —CF$_3$;
d) —CF$_2$(CF$_2$)$_z$CF$_2$O—, wherein z' is an integer 1 or 2;
e) —CH$_2$CF$_2$CF$_2$O—.

R$_f$ is monofunctional and has a (per)fluorooxyalkyl end group T, for example CF$_3$O—, C$_2$F$_5$O—, C$_3$F$_7$O—; optionally in perfluoroalkyl end groups one fluorine atom can be substituted with one chlorine or hydrogen atom. Examples of these end groups are Cl(C$_3$F$_6$O)—, H(C$_3$F$_6$O)—. The unit a) C$_3$F$_6$O is CF$_2$—CF(CF$_3$)O— or —CF(CF$_3$)CF$_2$O—.

The aqueous emulsion polymerization is well known in the prior art. See U.S. Pat. No. 6,639,011.

In the above formula R$_f$ preferably has one of the following structures:
1) T—(CF$_2$O)$_a$—(CF2CF$_2$O)$_b$—CF$_2$ b, a being integers, with b/a between 0.3 and 10, extremes included, a being an integer different from 0;
2) T—(CF$_2$—(CF$_2$)$_z$—CF$_2$O)$_b$—CF$_2$— b' and z' being integers,
wherein z' is an integer equal to 1 or 2;
3) T—(C$_3$F$_6$O)$_r$—(C$_2$F$_4$O)$_b$—(CFL$_0$O)$_t$—CF$_2$—r, b, t being integers,
with r/b ranging from 0.5 to 2.0, b being different from 0; (r+b)/t ranges from 10 to 30, where t is different from 0; the unit C$_3$F$_6$O can be —CF$_2$CF(CF$_3$)O— or —CF(CF$_3$)—CF$_2$O—;

a, b, b', r, t, are integers, their sum is such that R$_f$ has the above values of number average molecular weight.

The compounds wherein R$_f$ has the following formula:
T—(CF$_2$CF(CF$_3$)O)$_m$(CF$_2$O)$_n$—CF$_2$—
m, n being integers,
m/n ranges from 1 to 30, n being different from 0;
T=—OCF$_3$ or —OCF$_2$Cl, are still more preferred.

The (per)fluoropolyethers R$_f$ are obtainable with the well known process in the prior art, see for example the following patents herein incorporated by reference: U.S. Pat. Nos. 3,665,041, 2,242,218, 3,715,378 and EP 239,123. The fluoropolyethers functionalized with hydroxyl termination are for example obtained according to EP 148,482, U.S. Pat. No. 3,810,874. The functional end groups are obtained with the processes indicated in said patents.

Chain transfer agents can be used in the polymerization. For example iodide and/or bromides of alkaline or alkaline-earth metals, according to U.S. Pat. No. 5,173,553. Preferably chain transfer agents containing hydrogen as hydrocarbons, alcohols, in particular ethyl acetate and ethane are used.

The polymerization initiators used in the process of the present invention are preferably radical inorganic initiators as, for example, ammonium and/or potassium and/or sodium persulphate, optionally in combination with ferrous, cuprous or silver salts. The procedures of the initiator feeding into the polymerization reactor can be in a continuous way or by a single addition at the beginning of the polymerization.

The polymerization reaction is generally carried out at temperatures in the range 25° C.-70° C., preferably 50° C.-60° C., under pressure up to 30 bar (3 MPa), preferably higher than 8 bar (0.8 MPa).

Monomer (B) is fed into the polymerization reactor, in a continuous way or by steps.

When the polymerization is completed, the ionomer is isolated by conventional methods as the coagulation by addition of electrolytes or by freezing.

A further object of the present invention is a CCM assembly with subgaskets obtainable according to the process of the present invention by using subgasket rolls (B) adhesivized, with a hot melt adhesive, on the side in contact with the roll (A) surface. Preferably as hot melt adhesive, EVA (Ethylen Vinyl Acetate) is used.

The following Examples illustrate with non limitative purposes the present invention.

EXAMPLES

Example 1

Carrying out by DECAL method of a CCM assembly with subgasket adhesivized with hot melt adhesive.

A roll of extruded ionomeric membrane Hyflon® Ion (Solvay Solexis) is used, formed of a TFE/$CF_2$=CF—O($CF_2$)$_2$—$SO_3$H copolymer, having a thickness of 50 micrometers and 10,000×400 mm sizes.

As subgasket, PET is used, having a 32 micron thickness treated on one side with Ethylen Vinyl Acetate (EVA) (Perfex by PRIMA s.r.l., Milano).

The catalytic ink is prepared from a 1:1 mixture by weight of platinum supported on carbon (TEC10V50E by TANAKA, GP, JAPAN) with Hyflon® Ion (Solvay Solexis) ionomer dispersion in hydro-alcoholic solvent. A thickness of 100 micrometres of catalytic ink on rectangular surfaces having 358×138 mm sides spaced among them by a 80 mm empty space and centered in the direction of width with respect to the support itself, is spread by using a stratifying knife (BRAIVE) on a roll having a length of 10,000 mm of non porous PTFE support. The roll is continuously fed to a ventilated oven wherein the catalytic ink is dried (the feeding rate is regulated so as the residence time in the oven is 30 minutes at 65° C.). Two support rolls having a length of 10,000 mm are thus prepared having on one side rectangular surfaces of catalytic ink.

Step a)

A composite (A) formed, respectively, by a first support, the ionomeric membrane and the second support (the support sides with the deposited catalytic ink are faced to the ionomeric membrane, the rectangles of catalytic ink result aligned with each other on the two membrane sides) is inserted among the rolls of a calander set up according to the following parameters:

| | |
|---|---|
| Drum temperature: | 170° C. |
| Pressure exerted on the composite: | 40 Kg/cm$_2$ |
| Composite progress rate: | 0.5 metres/minute |

By using the "DECAL" process (U.S. Pat. Nos. 5,211,984 and 5,234,777), and by operating in a continuous way, the two catalytic layers are transferred from the PTFE support to the ionomeric membrane.

The two PTFE support rolls are then removed making sure that the catalytic layers remained completely adhered to the ionomeric membrane roll. A ionomeric membrane roll having a 10,000 mm length, see FIG. 2, is obtained. The roll has on both sides rectangles of dried catalytic ink having 358×138 mm sizes, spaced among them of 80 mm.

Step b)

Two rolls (B) of subgasket made of the above indicated material are prepared, each having 10,000 mm length and 400 mm width. In each roll rectangular holes are made having 350×130 mm size spaced among them of 88 mm and centered in the sense of width. See FIG. 3.

Step c)

A composite (C) formed, respectively, by the first subgasket roll, the ionomeric membrane sheet having on each side rectangular areas of dried catalytic ink, and of the second subgasket roll is prepared, taking into account the following conditions:

- the adhesivized sides of the subgaskets are faced to the ionomeric membrane,
- The rectangles of dried catalytic ink, must comprise the rectangular holes made in the subgaskets having on each side an overlapping area of the subgasket and the catalytic area.

See FIG. 4.

The composite (C) prepared as above is inserted among the rolls of a calander set up operating to the following conditions:

| | |
|---|---|
| Drum temperature: | 115° C. |
| Pressure exerted on the composite: | 10 Kg/cm$_2$ |
| Roll speed: | 0.8 metres/minute |

A roll having a 10,000 mm length is thus obtained from which 45 CCM with subgasket can be obtained by transversally cutting the roll according to parallel lines. Said lines are located externally to the active area. The distance between the cut lines is e.g. 218 mm. Each of these CCM with subgaskets has:

external sizes 400×218 mm;
active area of 350×130 mm sizes.

Figure 6A:
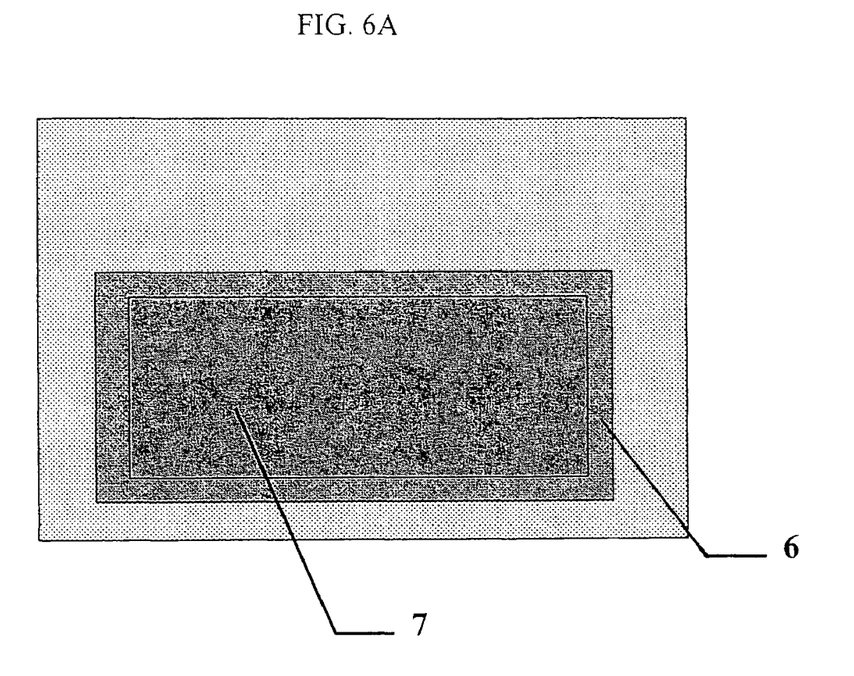
In FIGS. 6A and 6B, which illustrate examples of CCMs which can be obtained in accordance with the present invention, the dotted area corresponds to the external frame of the CCM. The CCM area includes a subgasket, and frame (6) represents the overlapping zone between the subgasket and the catalytic area, where (7) represents the active area.
Figure 6B:
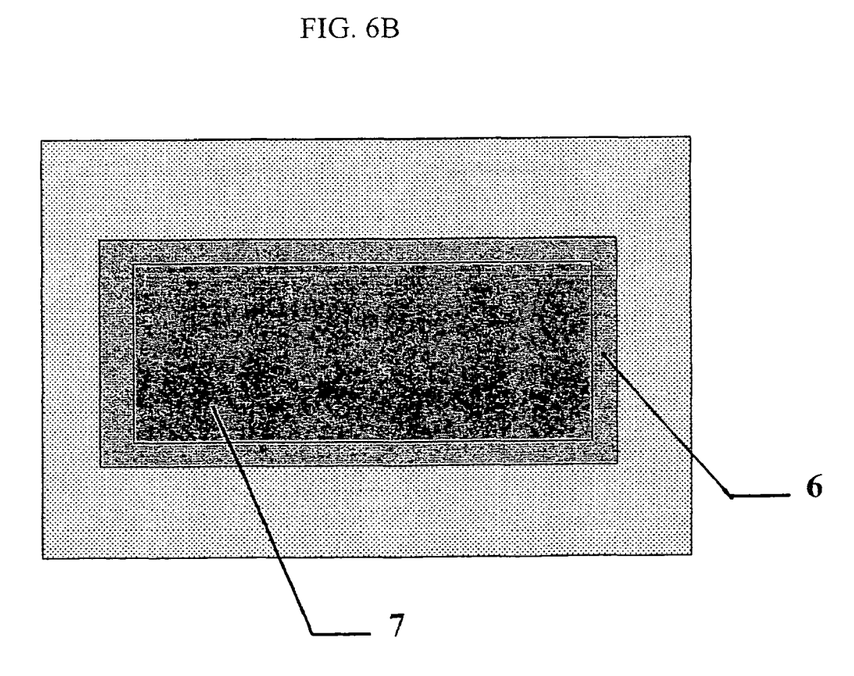

FIGS. 6A and 6B illustrate examples of CCM which can be obtained. In said Figures the dotted area corresponding to the external frame of the CCM is the CCM area coated with subgaskets, the frame (6) represents the overlapping zone between the subgasket and the catalytic area, (7) represents the active area.

The time employed for the subgasket application to the CCM (step c) is 12.5 minutes.

Example 2

Preparation by DECAL method of a CCM assembly with PET subgasket having softening point 140° C.

Steps a) and b) are repeated as in the Example 1.

In step a) an ionomeric membrane roll having a 10,000 mm length is obtained, see FIG. 2. Said roll on both sides has dried catalytic ink rectangles having 358×138 mm sizes, spaced among each other of 80 mm.

In step b) two rolls (B) of PET subgasket with softening point of 140° C. are prepared, each roll having a 10,000 mm length and 400 mm width. In both the rolls rectangular holes are made having a size of 350×130 mm, the holes spaced each other of 88 mm and centered in the direction of width.

In step c) a composite (C) formed, respectively, by the first subgasket roll, the ionomeric membrane sheet bearing on each side rectangular areas of catalytic ink and the second subgasket roll is prepared. The rectangles made of dried catalytic ink must comprise the rectangular holes made in the subgaskets. On each side is left an overlapping frame of the subgasket on the catalytic area.

The composite (C) prepared as above is inserted among the drums of a calander set up with the following parameters:

| | |
|---|---|
| Drum temperature: | 138° C. |
| Pressure exerted on the composite: | 30 Kg/cm$_2$ |
| Roll speed: | 0.15 metres/minute |

The other parameters being equal, it has been observed that a lower pressure or temperature or a higher roll speed with respect to the above values causes an adhesion which is not durable in the time between the CCM and the subgasket.

A roll 10,000 mm long is obtained. From the roll 45 CCM complete of subgasket are obtained, by transversally cutting the roll, following the same procedure of example 1. Each of these CCM with subgaskets shows:
external size 400×218 mm;
active area of size 350×130 mm.

The time employed for the subgasket application to the CCM (step c) is 66 minutes.

The invention claimed is:

1. A continuous process for preparing catalyst coated membrane (CCM) assemblies with subgaskets on both CCM sides, comprising the following steps:
   a) providing an ionomeric membrane sheet that is free of electrocatalytic layers;
   b) preparing an internal layer comprising a composite comprising a central layer formed of the ionomeric membrane sheet having an electrocatalytic layer positioned on each side only at longitudinally symmetrical regular intervals;
   c) preparing two surface layers comprising a subgasket sheet, wherein the subgasket sheet has openings corresponding to the position of the electrocatalytic layers of the internal layer; wherein the ratio of the subgasket sheet opening area to the electrocatalytic layer area is between 90% and 99%; and
   d) hot laminating the two surface layers onto the internal layer by simultaneously feeding the internal layer between the two surface layers between two drums so that the perimeter of the subgasket sheet openings of the two surface layers falls inside the area of the electrocatalytic layers,
   wherein the two surface layers are applied to the internal layer using one of the following processes:
      i. adhesivizing the two surface layers on the side to be in contact with the internal layer with a hot melt adhesive prior to hot laminating, and
      ii. adhesivizing the two surface layers on the side to be in contact with the internal layer with a pressure-sensitive adhesive prior to hot laminating.

2. A process according to claim 1, wherein the two surface layers have the same width as the internal layer.

3. A process according to claim 1, wherein the two surface layers comprise hydrogenated and/or fluorinated thermoplastic polymer sheets.

4. A process according to claim 1, wherein process i is used.

5. A process according to claim 4, wherein the hot melt adhesive is ethylene vinyl acetate (EVA).

6. A process according to claim 1, wherein in step d) the hot lamination is carried out under the following conditions:
   a roll progress rate of 0.1-5 m/min;
   pressure on the sheets to be laminated of 5-40 kg/cm$^2$; and
   a temperature higher than 100° C. and not higher than 150° C.

7. A process according to claim 1, wherein a lamination temperature between 100° C. and 130° C. is used when the two surface layers are formed of polyethyleneterephthalate (PET) adhesivized with ethylene vinyl acetate (EVA).

8. A process according to claim 1, wherein the ionomeric membrane sheet and the electrocatalytic layers of the internal layer are obtained using (per) fluorinated ionomers with —SO$_3$H groups and/or —COOH groups in acid or neutralized form, having an equivalent weight from 380 to 1,600 g/eq.

9. A process according to claim 8, wherein the ionomers comprise the following units:
   (A) monomeric units derived from one or more fluorinated monomers containing at least one ethylenic unsaturation; and at least one of:
   (B) fluorinated monomeric units containing sulphonyl groups —SO$_2$F in amounts such that the ionomer has the equivalent weight in the above range and
   (B') monomeric units containing precursor groups which are transformed by hydrolysis into acid groups —COOH, optionally their subsequent salification, in amounts such that the ionomer has the equivalent weight in the above range.

10. A process according to claim 8, wherein the ionomers are homopolymers formed of fluorinated monomeric units (B) containing sulphonyl groups —SO$_2$F, the ionomers containing the sulphonic groups in acid form —SO$_3$H or salified form being obtained by hydrolysis of the —SO$_2$F groups.

11. A process according to claim 9, wherein the fluorinated monomeric units (A) are selected from the group consisting of:
   vinylidene fluoride (VDF);
   $C_2$-$C_8$ perfluoroolefins;
   $C_2$-$C_8$ chloro- and/or bromo- and/or iodo-fluoroolefins;
   $CF_2$=$CFOR_{f1}$ (per)fluoroalkylvinylether (PAVE), wherein $R_{f1}$ is a $C_1$-$C_6$ (per) fluoroalkyl;
   $CF_2$=CFOX perfluoro-oxyalkylvinylethers, wherein X is a $C_1$-$C_{12}$ perfluoro-oxyalkyl having one or more ether groups; and
   fluorovinylethers (MOVE) of general formula $CFX_{AI}$=$CX_{AI}OCF_2OR_{AI}$ (A-I), wherein $R_{AI}$ is a linear or branched $C_1$-$C_6$ (per) fluoroalkyl group or $C_5$-$C_6$ cyclic, or a linear or branched $C_1$-$C_6$ (per) fluoro-oxyalkyl group containing from one to three oxygen atoms;
   when $R_{AI}$ is fluoralkyl or fluoro-oxyalkyl as above it can contain from 1 to 2 atoms, equal or different, selected from: H, Cl, Br, and I; and wherein) $X_{AI}$=F or H.

12. A process according to claim 9, wherein the ionomers comprise monomers (B') in admixture with monomers (B).

13. A process according to claim 1 wherein the ionomeric membrane comprises ionomers comprising from 0.01% to 2% by moles of monomeric units derived from a bis-olefin of formula:

wherein:
m =2-10;
$R_1, R_2, R_5, R_6$, are equal to or different from each other, and are H or $C_1$-$C_5$ alkyl groups.

14. A process according to claim 8, wherein the ionomeric membranes and the electrocatalytic layers contain perfluorinated ionomers obtained from ionomers comprising:
monomeric units derived from tetrafluoroethylene (TFE);
monomeric units derived from $CF_2$=CF—O—$CF_2CF_2SO_2F$.

15. A process according to claim 8, wherein the ionomers are crosslinked or crosslinkable.

16. A process according to claim 1, wherein the electrocatalytic layers comprise an ionomer and a catalyst.

17. A process according to claim 16, wherein the ratio by weight between catalyst and ionomer in each of the two electrocatalytic layers ranges from 0.5 to 4.

18. A process according to claim 16, wherein the ratio of weight of the catalyst to area of the electrocatalytic layer ranges from 0.01 to 2 mg/cm$^2$.

* * * * *